US011408596B1

(12) United States Patent
Mirth et al.

(10) Patent No.: US 11,408,596 B1
(45) Date of Patent: Aug. 9, 2022

(54) LIGHT TUBE

(71) Applicant: Artifox, LLC, St. Louis, MO (US)

(72) Inventors: Sarah Elizabeth-Carpenter Mirth, St. Louis, MO (US); Daniel Joseph Mirth, St. Louis, MO (US); Chico Weber, St. Louis, MO (US)

(73) Assignee: Artifox, LLC, St. Louis, MO (US)

( * ) Notice: Subject to any disclaimer, the term of this patent is extended or adjusted under 35 U.S.C. 154(b) by 278 days.

(21) Appl. No.: 16/702,242

(22) Filed: Dec. 3, 2019

Related U.S. Application Data

(63) Continuation-in-part of application No. 15/687,198, filed on Aug. 25, 2017, now Pat. No. 10,492,601.
(Continued)

(51) Int. Cl.
*F21V 21/096* (2006.01)
*F21V 23/04* (2006.01)
(Continued)

(52) U.S. Cl.
CPC ............ *F21V 21/096* (2013.01); *F21K 9/272* (2016.08); *F21K 9/278* (2016.08); *F21K 9/69* (2016.08); *F21V 21/14* (2013.01); *F21V 23/001* (2013.01); *F21V 23/04* (2013.01); *H02J 7/0042* (2013.01); *H02J 50/10* (2016.02); *H02J 50/90* (2016.02); *F21Y 2103/10* (2016.08); *F21Y 2115/10* (2016.08)

(58) Field of Classification Search
CPC ........ F21V 21/096; F21V 21/14; F21S 6/003; F21S 6/002; F21S 4/20
See application file for complete search history.

(56) References Cited

U.S. PATENT DOCUMENTS

| 958,440 A | 5/1910 | Sackman |
| 3,885,211 A | 5/1975 | Gutai |

(Continued)

OTHER PUBLICATIONS

Takahashi, Ryo et al., A Cuttable Wireless Power Transfer Sheet, Proceedings of the ACM on Interactive, Mobile, Wearable and Ubiquitous Technologies, vol. 2 Issue 4, Dec. 2018, Article No. 190, Association for Computing Machinery (ACM), New York, NY, USA.
(Continued)

*Primary Examiner* — William N Harris
(74) *Attorney, Agent, or Firm* — Creativenture Law, LLC; Dennis Jm Donahue, III; Kevin Staed

(57) ABSTRACT

A lighting device has a light tube with a cylindrical housing that has a longitudinal axis and encases an electrical circuit including a switch, a rechargeable battery, a secondary induction coil, a receiver circuit, and an elongated light panel. The cylindrical housing includes a ferromagnetic material and an elongated window, and the elongated light panel extends substantially parallel to the longitudinal axis adjacent to the elongated window. The light tube is magnetically held in place by a permanent magnet in a mount and can rotate around a concave surface on the forward side of the mount which has a complementary shape to the cylindrical housing of the light tube. The mount also has a primary induction coil and a transmitter circuit within the interior space of its shell. The mount can rotate on a base, and a power cord operatively engages the transmitter circuit in the mount.

20 Claims, 7 Drawing Sheets

Related U.S. Application Data

(60) Provisional application No. 62/382,058, filed on Aug. 31, 2016.

(51) Int. Cl.

| | | |
|---|---|---|
| *F21V 23/00* | (2015.01) | |
| *F21V 21/14* | (2006.01) | |
| *F21K 9/272* | (2016.01) | |
| *F21K 9/69* | (2016.01) | |
| *H02J 50/10* | (2016.01) | |
| *H02J 50/90* | (2016.01) | |
| *H02J 7/00* | (2006.01) | |
| *F21K 9/278* | (2016.01) | |
| *F21Y 103/10* | (2016.01) | |
| *F21Y 115/10* | (2016.01) | |

(56) References Cited

U.S. PATENT DOCUMENTS

| | | |
|---|---|---|
| 4,654,762 A | 3/1987 | Laverick |
| 4,719,549 A | 1/1988 | Apel |
| 5,704,702 A | 1/1998 | Goto |
| 5,825,637 A | 10/1998 | Chen |
| 6,436,299 B1 | 8/2002 | Baarman et al. |
| 6,659,620 B2 | 12/2003 | Goto |
| 6,825,620 B2 | 11/2004 | Kuennen et al. |
| 6,966,669 B2 | 11/2005 | Hussaini et al. |
| 7,217,013 B2 * | 5/2007 | Endo ............... F16M 11/14 362/190 |
| 7,249,864 B2 | 7/2007 | Smith et al. |
| 7,385,357 B2 | 6/2008 | Kuennen et al. |
| D622,885 S | 8/2010 | Ng et al. |
| 8,851,717 B2 | 10/2014 | Verbrugh |
| 8,947,043 B2 | 2/2015 | Jones et al. |
| 9,273,855 B2 | 3/2016 | Doble |
| 9,318,780 B2 | 4/2016 | Robertson et al. |
| 10,215,386 B1 * | 2/2019 | Zimmerman ......... F21V 21/29 |
| 2006/0250798 A1 * | 11/2006 | Herold ............... F21L 4/00 362/280 |
| 2010/0225174 A1 | 9/2010 | Jiang |
| 2010/0296275 A1 | 11/2010 | Chien |
| 2018/0031217 A1 * | 2/2018 | Tuchler ............ F21V 23/02 |
| 2020/0003397 A1 * | 1/2020 | Van Winkle ......... F21V 17/02 |

OTHER PUBLICATIONS

Frumusanu, Andrei,The State of Wireless Charging Standards in Mobile, Apr. 2, 2015, AnandTech, Retrieved from the Internet on Nov. 29, 2019 <URL: www.anandtech.com/print/9130/wireless-charging-standards-in-mobile>.

* cited by examiner

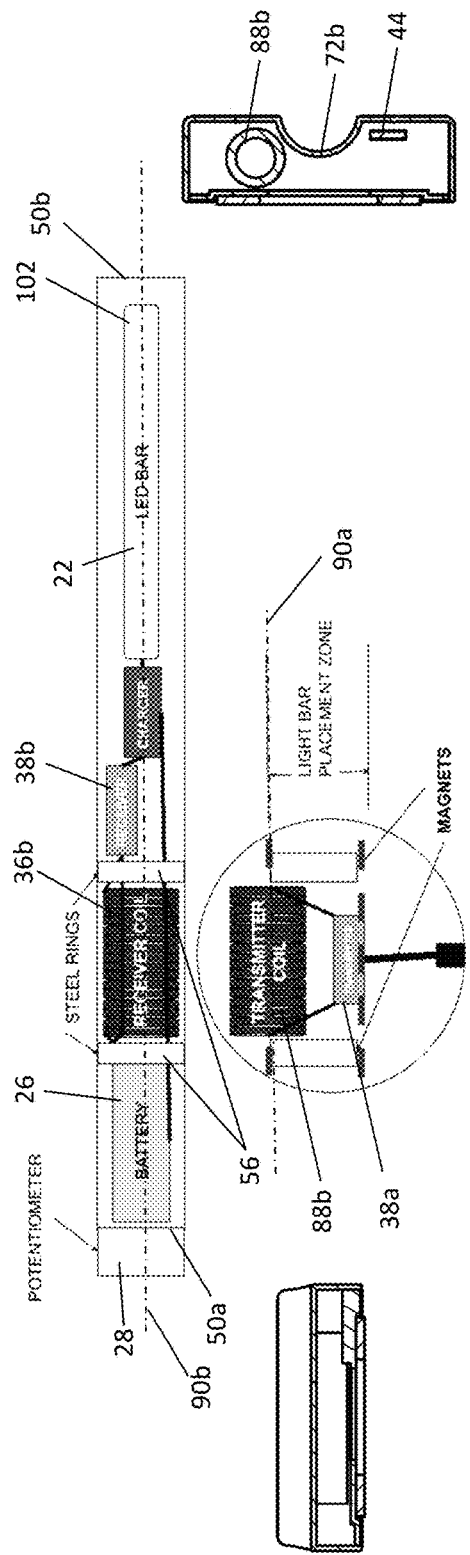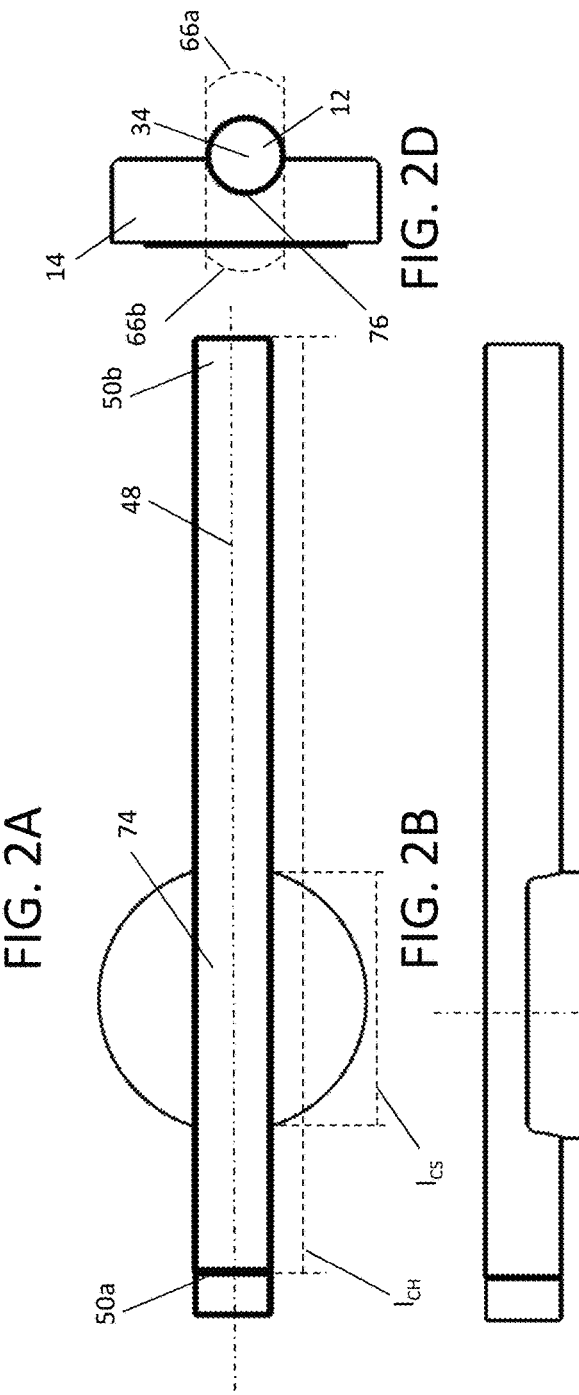

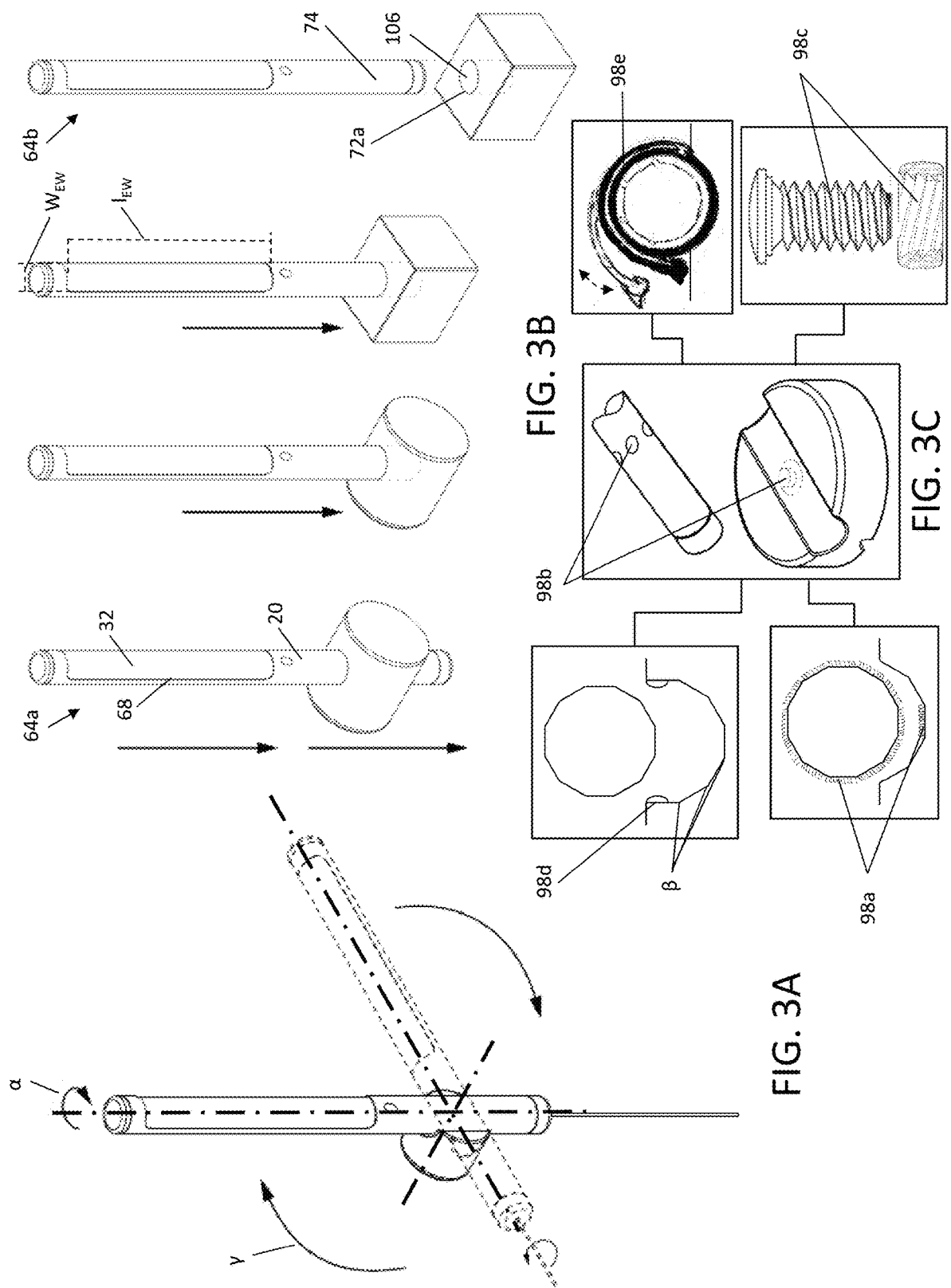

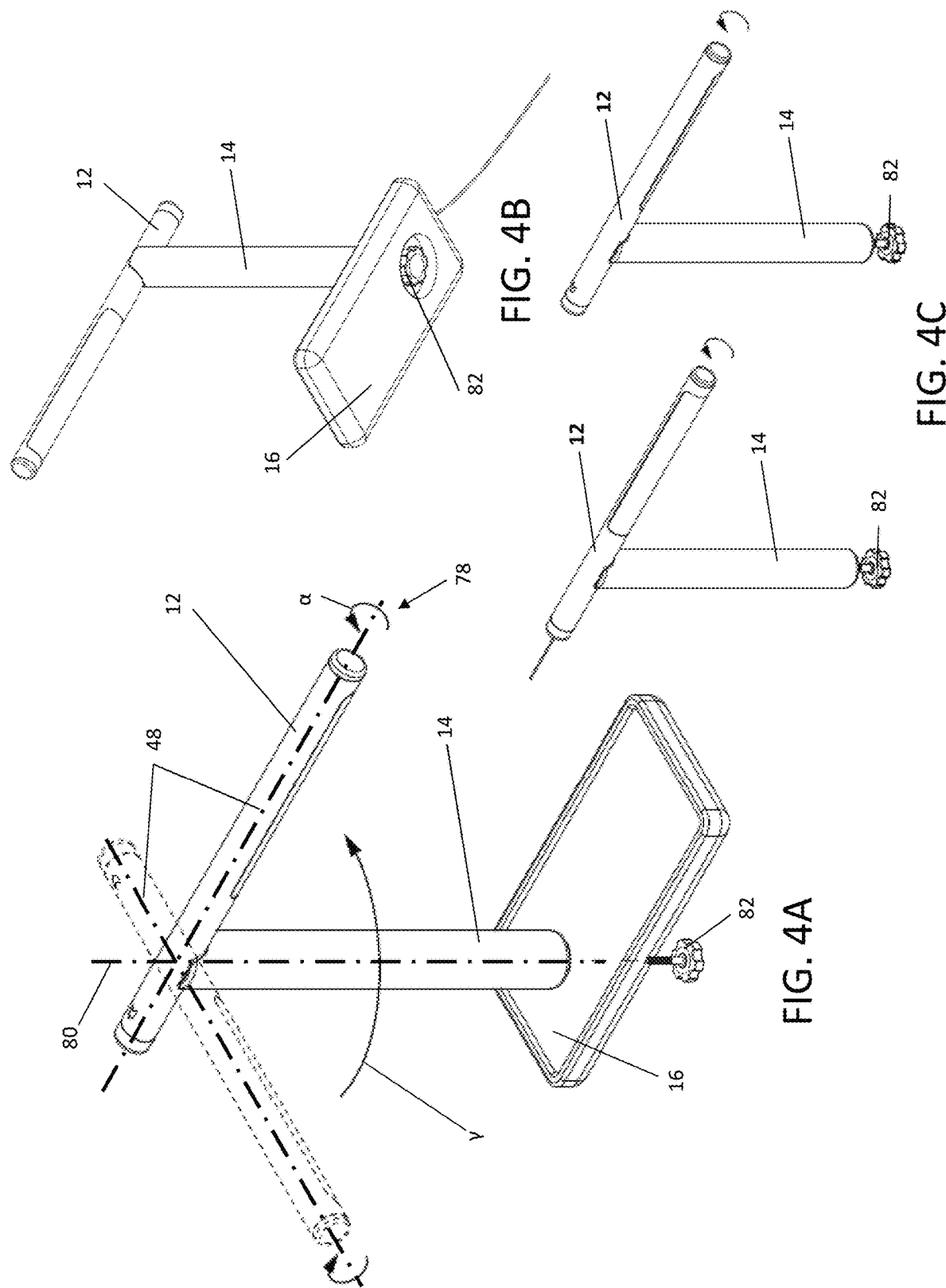

LIGHT TUBE

CROSS-REFERENCE TO RELATED APPLICATIONS

This application claims priority from and is a continuation-in-part of U.S. patent application Ser. No. 15/687,198 filed on Aug. 25, 2017 which claims priority from U.S. Provisional Patent Application No. 62/382,058 filed on Aug. 31, 2016, both of which are herein incorporated in their entireties.

STATEMENT REGARDING FEDERALLY SPONSORED RESEARCH

Not Applicable.

APPENDIX

Not Applicable.

BACKGROUND OF THE INVENTION

Field of the Invention

The present invention relates to a modular light tube that can be used with different mounting fixtures in a variety of ways and that allow the light tube to be rotated relative to the mounts while some of the mounts can also rotate relative to a base.

Related Art

Some prior art light assemblies may have magnetic connections between the body of a lighting device and a fixed mount which allows for the head of the lighting device to rotate relative to the mount. In some of these magnetically connected lights, the head is spaced from axis between the body and the mount so that the light rotates around the lateral axis, not the longitudinal axis extending between the body and the head, such as disclosed in U.S. Pat. No. 7,249,864. Other magnetically connected lights position the body between the light and the mount so although the head rotates along a longitudinal axis with the body, but the body does not completely encircle the longitudinal axis of rotation, such as disclosed in U.S. Pat. No. 8,851,717. Other prior art light assemblies that do not have a magnetic connection are known to have a head that is aligned with the body along the same longitudinal axis with a housing that completely encircles the longitudinal axis, such as disclosed in US Pat. App. Pub. No. 2010/0296275. However, in the '275 Application, the only longitudinal rotation of the head and body appears to be an indexing between a lens-down mode of operation and possibly a lens-up mode of operation because the complementing shape of the coupler in the detachable lamp device with the coupler in the stand unit only appears to allow for indexing by 180° along the longitudinal axis. The '275 Application also discloses a folding orientation between the lamp device and the stand unit, but this rotation is around a lateral axis, and the incremental longitudinal rotation of the body in the '717 Patent would not work with the device in the '275 Application. Therefore, although there has been a desire for magnetic connections between lighting devices and mounts and there has been at least one lighting device with a head that is aligned with the body along the same longitudinal axis, absent changes to the principles of operation of the prior art references which would render the prior art devices less useful for their intended purposes and possibly inoperable, the necessary changes to a lighting device and mount had not previously been successfully incorporated to produce these attributes in a single lighting assembly.

It has also been known in prior art light assemblies to power the lighting device by a rechargeable battery that is inductively charged when one end of the lighting device is secured within a base, such as disclosed in U.S. Pat. No. 3,885,211. However, no light assembly with an inductively charged rechargeable battery has incorporated a magnetic connection between the lighting device and the mount, and absent changes to the principles of operation of the prior art references, adding such a magnetic connection to the '211 Patent would not result in a light tube with an elongated window adjacent to a light panel that rotates about the longitudinal axis of the light tube.

SUMMARY OF THE INVENTION

A lighting device has a light tube with a cylindrical housing that defines a longitudinal axis of the light tube and encases an electrical circuit including a switch, a rechargeable battery, a secondary induction coil, a receiver circuit, and an elongated light panel. The cylindrical housing includes a ferromagnetic material and an elongated window, and the elongated light panel extends substantially parallel to the longitudinal axis is positioned laterally adjacent to the elongated window. The light tube is magnetically held in place by a permanent magnet in a mount and can rotate around a concave surface on the forward side of the mount which has a complementary shape to the cylindrical housing of the light tube. The mount also has a primary induction coil and a transmitter circuit within the interior space of its shell. The mount can rotate on a base. The base can be made from a ferromagnetic ring, and magnetic fasteners can hold the mount to the base. A power cord operatively engages at least one of the transmitter circuit in the mount, the rechargeable battery directly in the light tube, or the light panel directly in the light tube for embodiments that do not have a rechargeable battery.

In one aspect of the invention, the mount uses magnetic force to releasably hold the light tube's cylindrical housing. The forward side of the mount that engages the light tube has a concave shape that is complementary to the cylindrical housing which allows the light tube to rotate around its longitudinal axis.

In another aspect of the invention, the mount releasably holds the light tube's cylindrical housing with either magnetic force or a mechanical coupling, and the length of the light tube is greater than three times the longitudinal length of the mount. The mount's forward side that engages the light tube is concave and complementary to the cylindrical housing's shape which allows the light tube to rotate around its longitudinal axis.

In yet another aspect of the invention, the magnetic mount has a primary induction coil and transmitter circuit that inductively charges the rechargeable battery in the light tube through a secondary induction coil and receiver circuit in the light tube.

BRIEF DESCRIPTION OF THE DRAWINGS

The present invention will become more fully understood from the detailed description and the accompanying drawings, wherein:

FIG. 2A is a schematic view of an alternative arrangement for the electrical elements in the light tube and mount of the lighting device with cross-sectional views thereof.

FIG. 2B is a plan view of the lighting device.

FIG. 2C is a side view of the lighting device.

FIG. 2D is a front-facing view of the lighting device.

FIG. 3A is a perspective view of a lighting device with the light tube and the mount in various orientations.

FIG. 3B is a perspective view of the light tube shown in FIG. 3A with alternative shapes of the mount.

FIG. 3C are detail views of alternative fastener pairs.

FIGS. 4A-4C are perspective views of variations of tabletops in accordance with embodiments of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
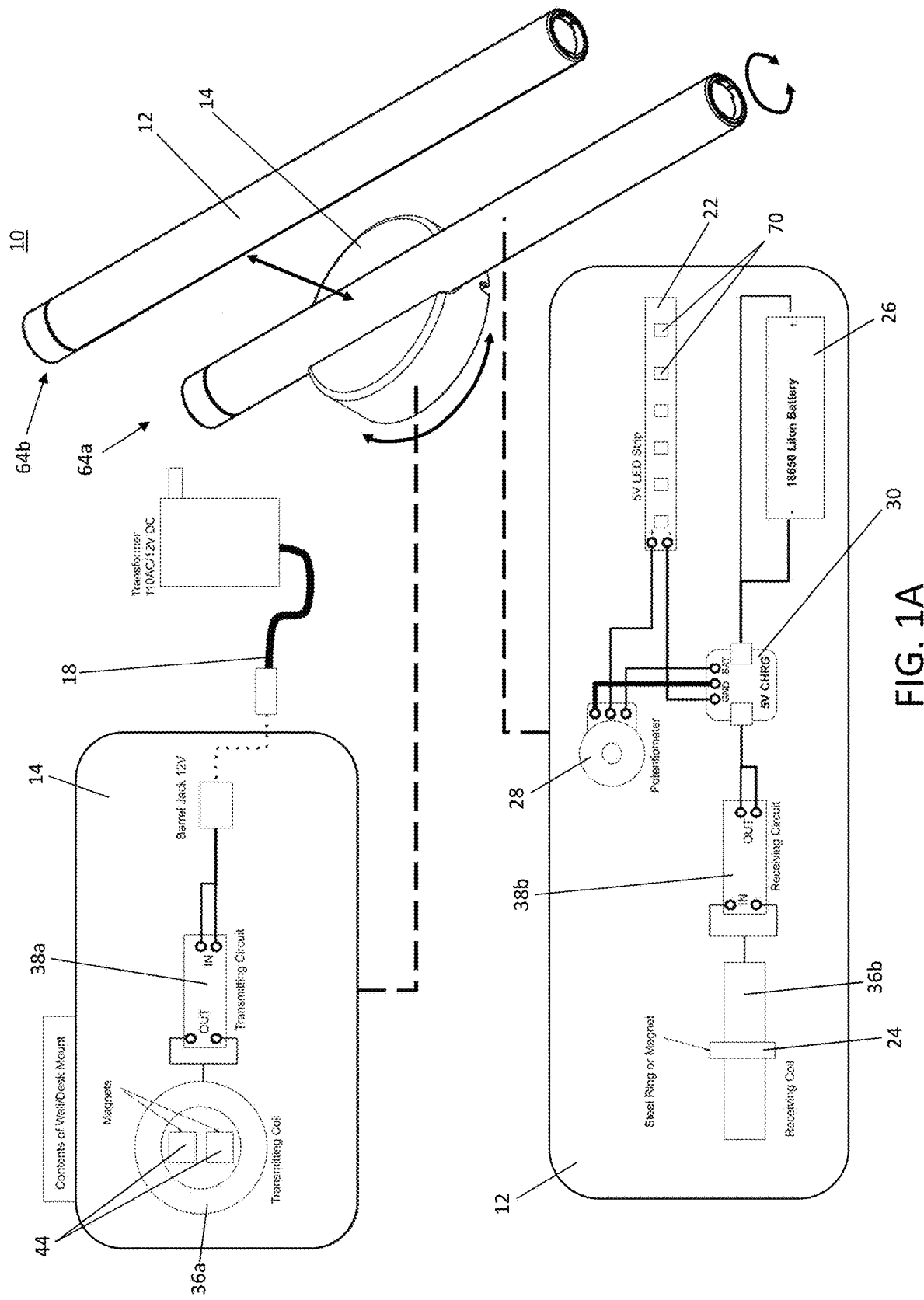
FIG. 1A shows schematic views of a lighting assembly with a light tube and a mount with a corresponding perspective view thereof according to an embodiment of the present invention.
Figure 1B:
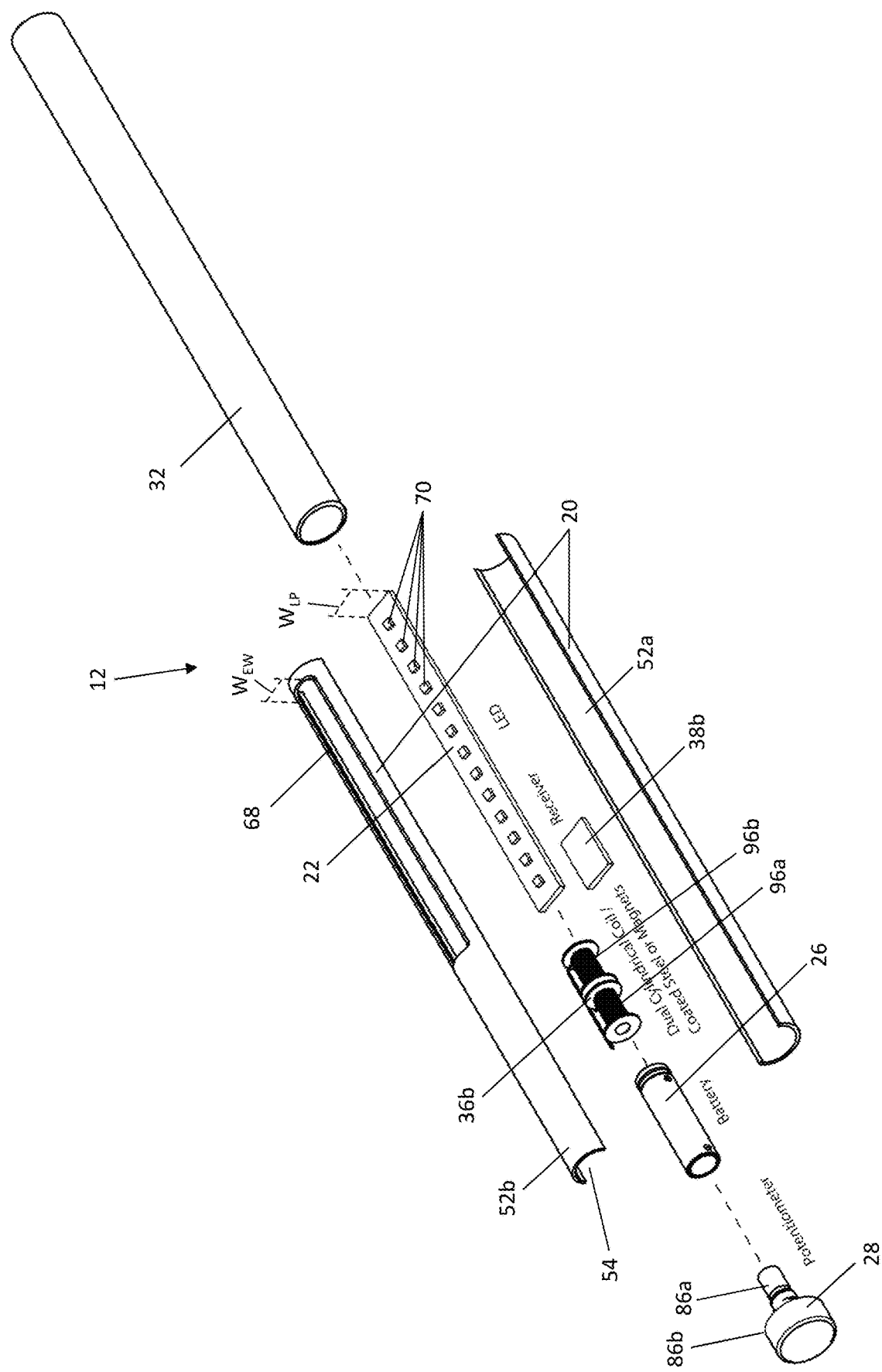
FIG. 1B is an exploded view of the light tube shown in FIG. 1A.

The lighting assembly 10 of the present invention has a light tube 12 that is releasably held by a mount 14 which is supported by a base 16. As shown in FIGS. 1A and 1B, the light tube has a cylindrical housing 20 with an elongated window 68, a lens 32 covering the elongated window, an elongated light panel 22, a ferromagnetic material 24, a secondary induction coil, a receiver circuit 38b, a rechargeable battery 26, a switch 28, and an electrical circuit 30 connecting the switch, the rechargeable battery, the secondary induction coil, the receiver circuit, and the elongated light panel. The mount has a shell with a concave surface, an interior space within the shell, a permanent magnet, and a primary induction coil operatively connected to a transmitter circuit 38a in the interior space. The lighting assembly also includes a power cord 18, and depending on the particular configuration of the light tube and the mount, the power cord supplies power to either the rechargeable battery in the light tube or the transmitter circuit in the mount. The length of the light tube's cylindrical housing along the longitudinal axis ($l_{CH}$) is greater than a longitudinal length of the mount's concave surface ($l_{CS}$). Preferably, the cylindrical housing's length is at least three (3) times as long as the concave surface's longitudinal length ($l_{CH} > 3 \times l_{CS}$), and the length of the elongated window ($l_{EW}$) is greater than the longitudinal length of the mount's concave surface ($l_{EW} > l_{CS}$). The width of the window ($W_{EW}$) shown in FIG. 1B is slightly narrower than the width of the light panel ($W_{LP}$), and the width of the window can be equal to or greater than the width of the light panel ($W_{EW} > W_{LP}$), such as shown in FIG. 3, and could even be fully open around the entire circumference around the light panel. Generally, the elongated window is situated between the internal space and the external surface of the housing and is positioned laterally adjacent to the elongated light panel.

The light tube's housing is preferably an elongated, thin-walled structure around the longitudinal axis 48 which extends from a proximal end 50a to a distal end 50b. The housing's internal surface 52a surrounds an internal space 54, and the switch is positioned proximate to the proximal end with a first portion 86a positioned within the internal space and a second portion 86b positioned adjacent to an external surface 52b. The elongated light panel extends substantially parallel to the longitudinal axis within the internal space from a location proximate 102 to the distal end towards the proximal end. The light panel preferably has light emitting diodes 70 (LEDs) on the side of the panel facing towards the adjacent elongated window. The rechargeable battery is also positioned within the internal space and is connected between the switch and the elongated light panel. The ferromagnetic material is preferably formed by one or more ring-shaped segments 56 that are positioned between the elongated light panel and the switch within the internal space and which have outer diameters that are proximate to the internal surface. Alternatively, the ferromagnetic material can be incorporated into a section of the cylindrical housing between the elongated light panel and the switch, or the entire cylindrical housing can be formed from the ferromagnetic material. The ferromagnetic material is preferably offset from the longitudinal center of the light tube.

As shown in FIG. 1B, the light tube's lens can surround the entire housing and form the exterior surface of the light tube so that there is a seamless surface with no seams or other discontinuities in the light tube's surface. It will also be appreciated that the cylindrical lens can alternatively serve as the housing, and in such a case, if there is any window, it may be an insert that is positioned against the internal surface and frames the region of the lens around the light panel. Alternatively, as shown in FIGS. 2 and 3, the lens may be internal to the housing or may only fit within and cover the elongated window, and in these designs, there is a seam between the frame section of the window and the lens. A potentiometer is shown at one end the light tube which can operate as an integrated power and dimming switch and results in a seam in the light tube. It is also possible to have no seam whatsoever in the light tube, such as when a touch sensitive switch is located on the lens, housing, or at the end of the light tube. The light panel may alternatively be operated by a motion sensor and/or a light sensor as an automatic switch or in combination with a manually-operated switch. Although it is not preferable, the light tube could alternatively have a switch on the cord.

The mount's shell 40 has a forward side 58a with a concave surface 62, a backside 58b with a substantially flat periphery, and a perimeter sidewall 60 between the forward side and the backside. One or more permanent magnets 44 are preferably situated in the interior space 42 proximate to the forward side's concave surface, and the light tube is magnetically held by the mount in an engaged position 64a and is released from the mount in a disengaged position 64b. The forward side's concave surface has a complementary cross-sectional shape 66a to a lateral cross-sectional shape 66b of the light tube's cylindrical housing at angles around the longitudinal axis. The ferromagnetic material in the light tube is laterally adjacent to the permanent magnet in the engaged position, and the light tube rotates relative to the mount along the longitudinal axis between a range of angles (a). The light tube respectively engages to the mount with the ferromagnetic material in the light tube adjacent to the permanent magnet at each one of the angles within the range of angles around the longitudinal axis. The range of angles has an angle span of at least 120° within the mount and can have a complete rotation of 360° without any structure inhibiting a free rotation 78. The range of angles can be continuous or may be indexed with a plurality of angles (β) between the angle span along with the angles at each end of the span. Preferably, the longitudinal center 34 of the light tube is offset from a center of the mount's concave surface 76.

It will be appreciated that the lighting assembly can have different arrangements of primary inductive coils 36a and secondary inductive coils 36b in the mount and light tube, respectively. Regardless of the arrangement of the induction coils, the engaged position of the light tube as it is magnetically held in the mount results in the alignment of the secondary coil with the primary coil. Preferably, the alignment of the inductive coils is maintained as the light tube rotates relative to the mount throughout the range of angles. In each of the embodiments, the light panel is preferably powered by the rechargeable battery which is charged by the induction coils. It is also possible for the rechargeable battery to be charged directly from the power cord. Additionally, it will be appreciated that the light panel can be powered directly from the power cord without any battery.

Figures 1C, 1D:
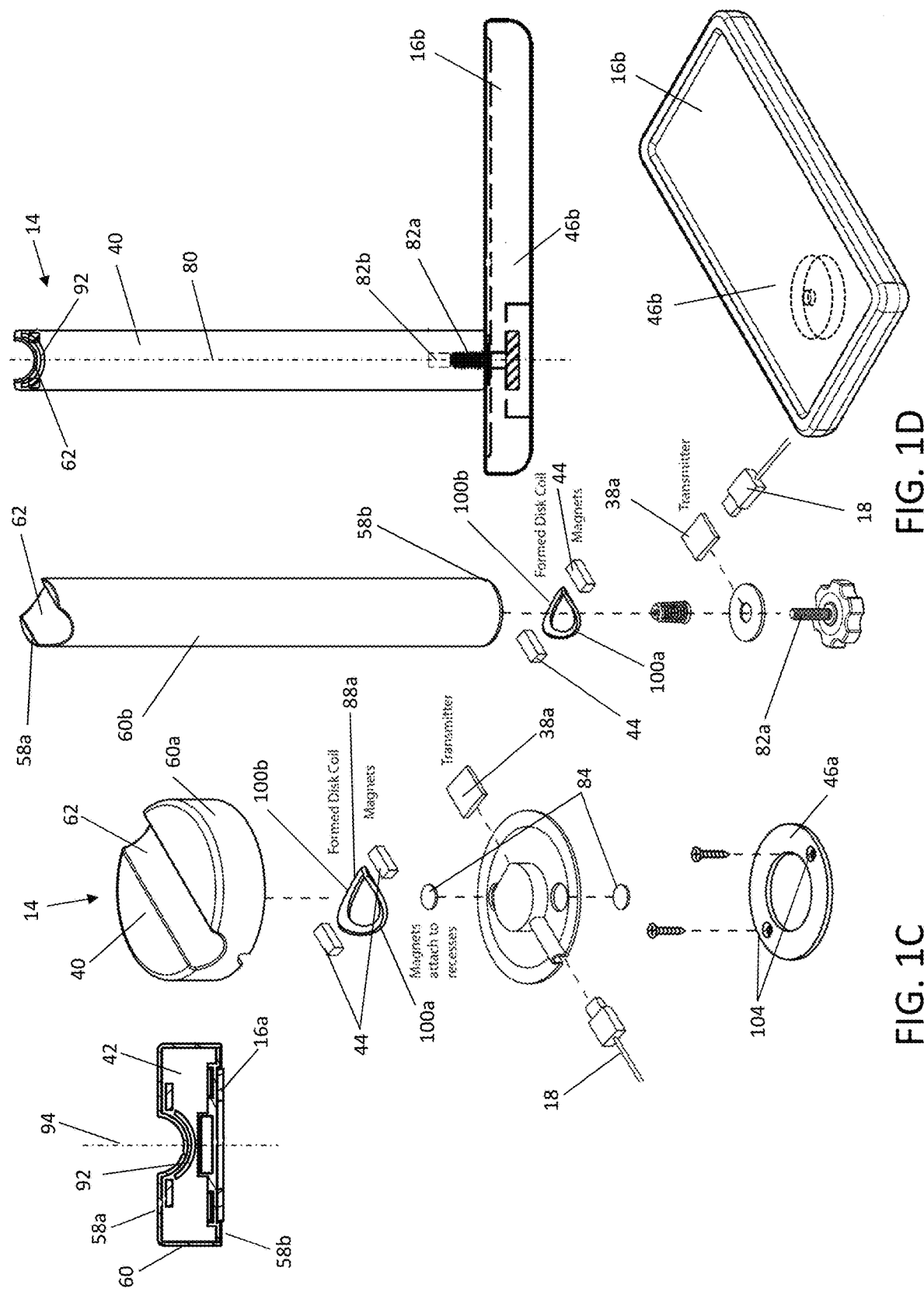
FIG. 1C is an exploded view of the mount shown in FIG. 1A with a ring base and a corresponding cross-section view of the mount and base.
FIG. 1D is an exploded view of an alternative shape for the mount with a platform base and a corresponding cross-section view thereof.

As shown in FIGS. 1C and 1D, the primary induction coil is a spiral coil 88a with a curve 92 that is complementary in shape to the mount's concave surface and with a first central axis 94 substantially perpendicular to longitudinal axis of the light tube's cylindrical housing; in this arrangement, the secondary induction coil is a dual-cylindrical coil 96 as shown in FIG. 1B. The dual-cylindrical coil has a first coil winding 96a separated from a second coil winding 96b, and in the engaged position, the first coil winding is aligned with a first section 100a of the spiral coil and the second coil winding is aligned with a second section 100b of the spiral coil. In another arrangement shown in FIG. 2A, the primary induction coil is a cylindrical coil 88b with a first central winding axis 90a parallel to the longitudinal axis of the light tube's cylindrical housing and offset from the mount's concave surface, and the secondary induction coil has a second central winding axis 90b in line with the longitudinal axis of the light tube's cylindrical housing. It will be appreciated that the different internal arrangements of the induction coils can be fit within the same exterior shape of the mount and light tube as evident from FIGS. 1B and 1C and FIGS. 2B-2D. Additionally, it will be appreciated that the lengthwise orientation of the light tube can be switched on the mount, i.e. flipped around, and the primary induction coil(s) will still produce the electric charge in the secondary induction coil(s).

The mount can be squat with a short perimeter sidewall 60a as shown in FIG. 1C or can be elongated with a long perimeter wall 60b as shown in FIG. 1D. Preferably, the mounts are connected to the base through one or more fasteners that allow the mounts to rotate relative to their respective bases around an axis 80 perpendicular to the longitudinal axis of the light tube's cylindrical housing. For the squat mount, the base 16a can be a ferromagnetic ring 46a, and magnetic fasteners 84 force the backside of the base against the ferromagnetic ring. The ferromagnetic ring has an outer diameter that fits in an inwardly-recessed circular center of the mount's backside. The backside also has a plurality of fastener mounting zones 104 proximate to a periphery of the inwardly-recessed circular center for the magnetic fasteners. For the elongated mount, the base 16b can be a platform support 46b, and a knob screw fastener 82a connects a threaded bore 82b in the backside of the mount to the platform support. The rotation of the light tube within the mount and the rotation of the mount (y) on the base are shown in FIGS. 3A and 4A.

It will be appreciated that the exterior shape of the light's housing can be cylindrical, prismatic, or any other convex shape that may be a matter of design choice, and the concave shape of the mount would be complementary thereto. Accordingly, the housing can have a cross-sectional shape that is circular, square, triangular, or any other geometric shape, although the circular shape is preferred to allow for the rotation of the housing through the continuous range of angles while the light tube remains engaged to the mount. For the other geometric shapes, the angles of rotation would be limited based on the indexing of the housing relative to the mount, and the light tube is first separated from the mount's complementary walls and then rotated before being reset into contact with the mount at the different angle. For the preferred circular cross-sectional shape of the housing, the concave surface of the mount's forward side is either a circular cross-section shape 72a that encircles a portion 74 of the external surface housing proximate to the magnetic material or a semicircular cross-section shape 72b that partially covers the portion of the external surface of the cylindrical housing proximate to the magnetic material.

The complementary walls of the mount's concave surface can form a partial enclosure around the housing as shown in FIGS. 1A, 2A, 3A, and 4A or they can form a complete tube shape that creates an aperture 106 within which the light tube's housing is fully enclosed as shown in FIG. 3B. In the former design configuration, the light tube can be separated from the mount and connected to the mount without any sliding motion, and in the latter design configuration, the light tube is inserted and removed from the mount by sliding the light tube through the openings on either side of the aperture. As shown in FIG. 3B, the fully enclosing mount can have different external shapes. As shown in FIG. 3C, the lateral cross-sectional shape of the light tube can be circular or polygonal, and the cross-sectional shape of the concave mount's surface is generally complementary.

Although the mating between the light tube and the mount is preferably magnetic, there are other mechanisms that can be used for attaching the light tube to the mount. Generally, for mechanical attachments between the light tube and the mount, since the light tube rotates relative to the mount, the mount preferably has a single mechanical coupler while the light tube has a set of mechanical couplers radially spaced around the circumference of the cylindrical housing. For example, as shown in FIG. 3C, the set of mechanical connectors 98 and the mechanical coupler can be chosen from any number of fastener pairs, such as hook and loop fasteners 98a, stud and snap fasteners 98b which may also include magnetic attraction between the stud and snap, and through-holes in the light tube that receive a screw 98c that engages a threaded bore in the mount. As also shown in FIG. 3C, it is possible for the mount to hold the light tube in place at the various angles of rotation by using clamping the light tube within the mount's concave surface, such as with friction-fit fasteners that engage the external surface of the cylindrical housing and may include detents 98d, possibly including spring-biased detents, or a clamshell clamp 98e over the external surface of the cylindrical housing.

Figure 5:
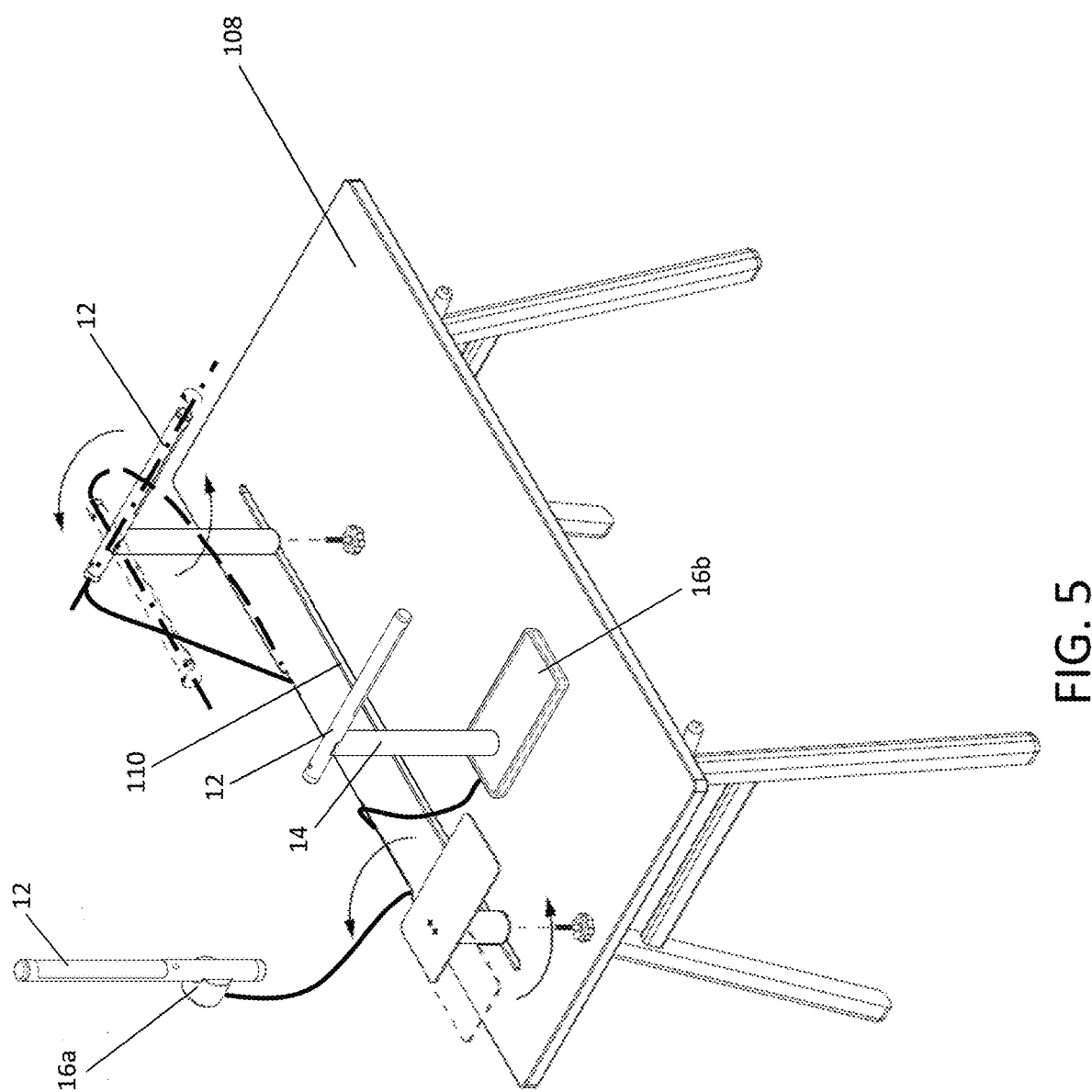
FIG. 5 is a perspective view of various lighting assemblies used in their arrangements on a table and on a wall.

As shown in FIG. 5, the base can be placed on a horizontal surface or can be affixed vertically to a wall. Accordingly, the mount can be arranged horizontally or vertically depending on the orientation of the base. Although a magnetic connection is preferred between the squat mount and the base, this configuration may have a notched rotation or ball bearings. Preferably, the elongated mount is attached to a standard lamp stand base that can rest on a desk, table, counter, or similar surface 108. Generally, the elongated mount can be anchored through an aperture in any type of support surface including a table with apertures in the top surface 110. The power cord preferably runs through a channel in the mount's sidewall between the base and the mount to the primary induction coil so that the rechargeable battery in the light tube can be wirelessly charged by the secondary induction coil, allowing the light tube to operate by battery power and remain cordless so it can be removed from the various mounts.

The light tube preferably has a lithium-ion rechargeable battery and is powered and wirelessly charged using near field inductive charging rather than being coupled with direct contact points as found in most standard lighting devices. For the corded version of the light tube, the power cord is connected to the light, preferably at the end opposite from the light, rather than being threaded through the mount or base as found in most standard lighting devices. This connection of the cord directly to the light tube allows for the light to be alternatively mounted to the desk stand, to another stand apart from the desk, and to a wall mount. The power cord could be fixed to the light panel in the light tube as with standard lights. In the preferred embodiments, the light tube nests on a magnetic or clipping surface within the stand or wall mount, and the light's rechargeable battery charges when it in its mount. Accordingly, the power cord is preferably connected to the primary induction coil in the base. It will also be appreciated that the power cord could be removably connected to the base or the light tube, such as with a USB cable or an AC to DC transformer with a wire extending to a male jack. When the power cord directly powers the rechargeable battery in the light tube, the removable connection to the light would be beneficial.

The light tube design is different from a standard torch or flashlight because the light emits from the long portion of the tube rather than the end. Accordingly, in the preferred embodiment, the light tube functions more like a lantern or a sconce which allows for many functions, such as a reading light, desk light, walkway light, hall light or mobile lantern. The light rotates about its center axis while nested in the m mount, wall mount, desk channel or as a standalone piece. Different configurations and arrangements of the light tube with various mounts are shown in FIG. 5 and show the light tube as it rotates about its longitudinal axis within the mount and as the mount rotate around the base. When the light tube is connected to the mount on the wall, the light tube can be rotated about its longitudinal axis so that the elongated window faces outward, faces the wall, faces upward, faces downward, or faces any other direction. Similarly, when the light tube is connected to a mount on the desk, the light tube can be rotated to face the tabletop, face upward, face backward, face forward, or face any other direction. Additionally, as explained above and shown in the corresponding drawings, the light tube can also be rotated with the mount as it rotates relative to the base. It will be appreciated that a second light panel could be positioned within the housing in a back-to-back arrangement with the first light panel and may be flat or curved or additional panels could form a prism shape so that the light tube of the present invention could serve as a torch light or a lantern with LEDs directed toward different radial directions around the light tube.

The embodiments explain the principles of the invention and its practical application to persons skilled in the art.

Modifications could be made to the embodiments without departing from the scope of the invention, and all matter contained in the foregoing description and shown in the accompanying drawings are illustrative, not limiting. For example, the induction coils can be adjacent to each other as described above and shown in the corresponding drawings, or when the mount surrounds the light tube's housing, the induction coils be concentric with each other as in U.S. Pat. No. 3,885,211 which is incorporated by reference herein; similarly, the induction coils may be in-line with each other as in the '211 Patent when the mount is in-line with the light tube as in US Pat. App. Pub. No. 2010/0296275 which is also incorporated by reference herein. It will also be appreciated that multiple secondary induction coils with spiral coils that are complementary to the internal surface of the cylindrical housing could overlap with each other to provide yet another way to inductively charge the rechargeable battery at the various longitudinal-rotation orientations of the light tube. Thus, the breadth and scope of the present invention should not be limited by any of the above-described embodiments, but should be defined only in accordance with the following claims appended hereto and their equivalents.

What is claimed is:

1. A lighting assembly, comprising:
 a light tube comprising a cylindrical housing, an elongated light panel, a ferromagnetic material, a rechargeable battery, a switch, and an electrical circuit connecting the switch, the rechargeable battery, and the elongated light panel, wherein the cylindrical housing has a longitudinal axis and is comprised of a proximal end, a distal end, an internal surface surrounding an internal space, and an external surface, wherein the elongated light panel extends substantially parallel to the longitudinal axis within the internal space from a location proximate to the distal end towards the proximal end, wherein the rechargeable battery is positioned within the internal space proximate to the elongated light panel, and wherein the ferromagnetic material is incorporated into at least one of a section of the cylindrical housing longitudinally spaced from the elongated light panel and a ring-shaped segment longitudinally spaced from the elongated light panel and laterally spanning the internal space; and
 a mount comprising a shell, an interior space within the shell, and a permanent magnet, wherein the shell is comprised of a backside, a forward side, and a perimeter sidewall between the backside and the forward side, wherein the forward side has a concave surface, wherein the permanent magnet is situated in the interior space proximate to the concave surface of the forward side, wherein the light tube is magnetically held by the mount in an engaged position and is released from the mount in a disengaged position, wherein the ferromagnetic material in the light tube is adjacent to the permanent magnet in the engaged position, wherein the concave surface of the forward side has a complementary cross-sectional shape to a lateral cross-sectional shape the cylindrical housing of the light tube at a plurality of angles around the longitudinal axis, wherein the light tube respectively engages to the mount with the ferromagnetic material in the light tube adjacent to the permanent magnet at each one of the angles within a range of angles around the longitudinal axis, and wherein a length of the cylindrical housing along the longitudinal axis is greater than a longitudinal length of the concave surface.

2. The lighting assembly of claim 1, wherein the cylindrical housing is further comprised of an elongated window located adjacent to the elongated light panel, wherein the light tube further comprises a lens covering at least the elongated window, and wherein the elongated light panel is further comprised of a plurality of LEDs facing towards the elongated window.

3. The lighting assembly of claim 2, wherein the length of the light tube's cylindrical housing along the longitudinal axis is at least three times as long as the longitudinal length of the mount's concave surface, wherein a length of the elongated window is greater than the longitudinal length of the mount's concave surface, wherein the proximal end and the distal end of the cylindrical housing extend past the perimeter sidewall at opposite sides of the mount when the light tube is in the engaged position, wherein the concave surface of the mount's forward side has at least one of a semicircular cross-section shape and a circular cross-section shape, wherein the circular cross-section shape encircles a portion of the external surface of the cylindrical housing proximate to the magnetic material, and wherein the semicircular cross-section shape partially covers the portion of the external surface of the cylindrical housing proximate to the magnetic material.

4. The lighting assembly of claim 2, wherein the lens covers the entire housing, wherein the ferromagnetic material is offset from a longitudinal center of the light tube, wherein the longitudinal center of the light tube is offset from a center of the mount's concave surface, wherein the range of angles is a continuous range with an angle span of 360°, and wherein the cylindrical housing has a free rotation while engaged with the mount without any structure inhibiting the free rotation.

5. The lighting assembly of claim 1, further comprising a base, wherein the mount is attached to the base, and wherein the mount rotates relative to the base around an axis perpendicular to the longitudinal axis of the cylindrical housing.

6. The lighting assembly of claim 5, wherein the base is comprised of at least one of a platform support and a ferromagnetic ring, wherein a knob screw fastener connects a threaded bore in the backside of the mount to the platform support, and wherein a plurality of magnetic fasteners force the backside of the mount against the ferromagnetic ring.

7. The lighting assembly of claim 1, wherein the mount further comprises a primary induction coil and a transmitter circuit within the interior space of the mount, wherein the light tube further comprises a secondary induction coil and a receiver circuit, wherein the primary induction coil is operatively connected to the transmitter circuit, wherein the secondary induction coil is connected through the electrical circuit to the switch, the rechargeable battery, and the elongated light panel within the internal space of the cylindrical housing, and wherein the engaged position aligns the secondary coil with the primary coil through the range of angles by the light tube magnetically held in the mount.

8. The lighting assembly of claim 7, further comprising a power cord operatively engaging at least one of the rechargeable battery in the light tube and the transmitter circuit in the mount, wherein the switch is positioned proximate to the proximal end with a first portion positioned within the internal space of the cylindrical housing and a second portion positioned adjacent to the external surface of the cylindrical housing.

9. The lighting assembly of claim 7, wherein the primary induction coil is a cylindrical coil with a first central winding axis parallel to the longitudinal axis of the light tube's cylindrical housing and offset from the mount's concave surface, and wherein the secondary induction coil has a second central winding axis in line with the longitudinal axis of the light tube's cylindrical housing.

10. The lighting assembly of claim 7, wherein the primary induction coil is a spiral coil with a curve complementary in shape to the mount's concave surface and with a first central axis substantially perpendicular to the longitudinal axis of the light tube's cylindrical housing, wherein the secondary induction coil is a dual-cylindrical coil comprised of a first coil winding separated from a second coil winding, and wherein the engaged position aligns the first coil winding with a first section of the spiral coil and aligns the second coil winding with a second section of the spiral coil.

11. A lighting assembly, comprising:
a light tube comprising a cylindrical housing, a lens, an elongated light panel, a switch, an electrical circuit connecting the switch and the elongated light panel, and at least one of a ferromagnetic material and a set of mechanical connectors, wherein the cylindrical housing has a longitudinal axis and is comprised of a proximal end, a distal end, an internal surface surrounding an internal space, an external surface, and an elongated window situated between the internal space and the external surface and positioned laterally adjacent to the elongated light panel, wherein the elongated light panel extends substantially parallel to the longitudinal axis within the internal space from a location proximate to the distal end towards the proximal end, wherein the elongated light panel is further comprised of a plurality of LEDs facing towards the elongated window, and wherein the lens covers at least the elongated window;
a mount comprising a shell, an interior space within the shell, and at least one of a permanent magnet and a mechanical coupler, wherein the light tube is held by the mount in an engaged position and is released from the mount in a disengaged position, wherein the shell is comprised of a backside, a forward side, and a perimeter sidewall between the backside and the forward side, wherein the forward side has a concave surface, wherein the concave surface of the forward side has a complementary cross-sectional shape to a lateral cross-sectional shape of the cylindrical housing of the light tube at a plurality of angles around the longitudinal axis, wherein at least one of the permanent magnet and the mechanical coupler releasably connects to the ferromagnetic material and at least one mechanical connector in the set of mechanical connectors at a laterally adjacent arrangement in the engaged position, respectively, wherein a length of the light tube's cylindrical housing along the longitudinal axis is at least three times as long as a longitudinal length of the mount's concave surface, and wherein a length of the elongated window is greater than the longitudinal length of the mount's concave surface.

12. The lighting assembly of claim 11, wherein the ferromagnetic material is incorporated into at least one of a section of the cylindrical housing between the elongated light panel and the switch and a ring-shaped segment positioned between the elongated light panel and the switch within the internal space proximate to the internal surface, wherein the set of mechanical connectors and the mechanical coupler are selected from the group of fastener pairs consisting of stud and snap fasteners, stud and snap magnetic fasteners, hook and loop fasteners, through-holes in the light tube receiving a screw engaged with a threaded bore, friction-fit fasteners, friction-fit fasteners with detents, friction-fit fasteners with spring-biased detents, and a clamshell clamp over the external surface of the cylindrical housing.

13. The lighting assembly of claim 12, wherein the light tube further comprises a rechargeable battery positioned within the internal space, wherein the mount further comprises a transmitter circuit and a primary induction coil within the interior space of the mount, wherein the light tube further comprises a secondary induction coil and a receiver circuit, wherein the primary induction coil is operatively connected to the transmitter circuit, wherein the secondary induction coil is connected through the electrical circuit to the switch, the rechargeable battery, and the elongated light panel, and wherein the laterally adjacent arrangement in the engaged position aligns the secondary coil with the primary coil through at each one of the angles of the light tube relative to the mount.

14. The lighting assembly of claim 13, further comprising a base, and a power cord, wherein the mount is attached to the base, wherein the power cord operatively engages at least one of the rechargeable battery in the light tube and the transmitter circuit in the mount, wherein the power cord is at least one of a USB cable and an AC to DC transformer with a wire extending to a male jack, and wherein the mount rotates relative to the base around an axis perpendicular to the longitudinal axis of the cylindrical housing.

15. The lighting assembly of claim 11, wherein the proximal end and the distal end of the cylindrical housing respectively extend past the perimeter sidewall on opposite sides of the mount by a first distance and a second distance when the light tube and the mount have the laterally adjacent arrangement in the engaged position, and wherein the first distance is greater than the second distance.

16. A lighting assembly, comprising:
a light tube comprising a housing, an elongated light panel, a ferromagnetic material, a secondary induction coil, a receiver circuit, a rechargeable battery, a switch, and an electrical circuit connecting the switch, the rechargeable battery, the secondary induction coil, the receiver circuit, and the elongated light panel, wherein the housing has a longitudinal axis and is comprised of a proximal end, a distal end, an internal surface surrounding an internal space, an external surface, and an elongated window situated between the internal space and the external surface and positioned adjacent to the elongated light panel, wherein the elongated light panel extends substantially parallel to the longitudinal axis within the internal space from a location proximate to the distal end towards the proximal end, and wherein the elongated light panel is further comprised of a plurality of LEDs facing towards the elongated window;
a mount comprising a shell, an interior space within the shell, a permanent magnet, and a primary induction coil operatively connected to a transmitter circuit, wherein the shell is comprised of a backside, a forward side, and a perimeter sidewall between the backside and the forward side, wherein the forward side has a concave surface, wherein the permanent magnet is situated in the interior space proximate to the concave surface of the forward side, wherein the light tube is magnetically held by the mount in an engaged position and is released from the mount in a disengaged position, wherein the concave surface of the forward side has a complementary shape to the housing of the light tube, wherein the ferromagnetic material in the light tube is adjacent to the permanent magnet in the engaged position, wherein the light tube rotates relative to the mount along the longitudinal axis between a range of angles in the engaged position, and wherein the engaged position aligns the secondary coil with the primary coil through the range of angles.

17. The lighting assembly of claim 16, wherein the light tube is further comprised of a lens covering at least the elongated window, wherein the light tube's housing has a cylindrical shape, wherein the concave surface of the mount's forward side has at least one of a semicircular cross-section shape and a circular cross-section shape, wherein a length of the housing along the longitudinal axis is at least three times as long as a longitudinal length of the mount's concave surface, and wherein a length of the elongated window is greater than the longitudinal length of the mount's concave surface.

18. The lighting assembly of claim 16, further comprising a base and a power cord, wherein the power cord operatively engages the transmitter circuit in the mount, wherein the mount is attached to the base, wherein the mount rotates relative to the base around an axis perpendicular to the longitudinal axis of the cylindrical housing, and wherein the range of angles for the light tube rotating relative to the mount has an angle span of at least 120°.

19. The lighting assembly of claim 16, wherein the primary induction coil is a cylindrical coil with a first central winding axis parallel to the longitudinal axis of the light tube's housing and offset from the mount's concave surface, and wherein the secondary induction coil has a second central winding axis in line with the longitudinal axis of the light tube's housing.

20. The lighting assembly of claim 16, wherein the primary induction coil is a spiral coil with a curve complementary in shape to the mount's concave surface and with a first central axis substantially perpendicular to the longitudinal axis of the light tube's housing, wherein the secondary induction coil is a dual-cylindrical coil comprised of a first coil winding separated from a second coil winding, and wherein the engaged position aligns the first coil winding with a first section of the spiral coil and aligns the second coil winding with a second section of the spiral coil.

* * * * *